United States Patent
Hagiwara

(10) Patent No.: US 7,630,831 B2
(45) Date of Patent: Dec. 8, 2009

(54) NAVIGATION SYSTEM

(75) Inventor: Kazuhiko Hagiwara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 11/500,304

(22) Filed: Aug. 8, 2006

(65) Prior Publication Data
US 2009/0157297 A1    Jun. 18, 2009

(30) Foreign Application Priority Data
Aug. 24, 2005    (JP) ............... 2005-242930

(51) Int. Cl.
G01C 21/30 (2006.01)
G01C 21/32 (2006.01)
G08G 1/123 (2006.01)

(52) U.S. Cl. ............ 701/209; 701/211; 701/202; 701/210; 340/995; 345/837

(58) Field of Classification Search ......... 701/209, 701/211, 202, 210
See application file for complete search history.

(56) References Cited

U.S. PATENT DOCUMENTS

| | | | | |
|---|---|---|---|---|
| 5,565,874 A * | 10/1996 | Rode | ............... | 342/457 |
| 5,608,635 A * | 3/1997 | Tamai | ............... | 701/209 |
| 5,938,720 A * | 8/1999 | Tamai | ............... | 701/209 |
| 6,061,003 A * | 5/2000 | Harada | ............... | 340/995.15 |
| 6,266,614 B1 * | 7/2001 | Alumbaugh | ............... | 701/211 |
| 6,278,938 B1 * | 8/2001 | Alumbaugh | ............... | 701/208 |
| 6,721,651 B1 * | 4/2004 | Minelli | ............... | 701/200 |
| 6,795,769 B2 * | 9/2004 | Kaji et al. | ............... | 701/209 |
| 6,826,472 B1 * | 11/2004 | Kamei et al. | ............... | 701/202 |
| 6,898,525 B1 * | 5/2005 | Minelli | ............... | 701/213 |
| 6,975,940 B1 * | 12/2005 | Childs et al. | ............... | 701/209 |
| 7,110,879 B2 * | 9/2006 | Friedrichs et al. | ............... | 701/202 |
| 7,120,539 B2 * | 10/2006 | Krull et al. | ............... | 701/210 |
| 2002/0130906 A1 * | 9/2002 | Miyaki | ............... | 345/837 |
| 2002/0165666 A1 * | 11/2002 | Fuchs et al. | ............... | 701/209 |
| 2002/0177944 A1 * | 11/2002 | Ihara et al. | ............... | 701/208 |
| 2003/0028318 A1 * | 2/2003 | Kaji et al. | ............... | 701/209 |
| 2003/0120422 A1 * | 6/2003 | Cochlovius et al. | ............... | 701/201 |
| 2003/0130788 A1 * | 7/2003 | Akashi | ............... | 701/209 |
| 2003/0158652 A1 * | 8/2003 | Friedrichs et al. | ............... | 701/202 |
| 2004/0102898 A1 * | 5/2004 | Yokota et al. | ............... | 701/210 |
| 2006/0241855 A1 * | 10/2006 | Joe et al. | ............... | 701/202 |

FOREIGN PATENT DOCUMENTS

| | | |
|---|---|---|
| JP | A-H06-110383 | 4/1994 |
| JP | A-H07-098799 | 4/1995 |
| JP | A-H09-304104 | 11/1997 |
| JP | A-2002-243486 | 8/2002 |
| JP | A-2004-132884 | 4/2004 |
| JP | A-2004-177186 | 6/2004 |
| JP | A-2004-340757 | 12/2004 |

* cited by examiner

Primary Examiner—Khoi Tran
Assistant Examiner—Ian Jen
(74) Attorney, Agent, or Firm—Posz Law Group, PLC

(57) ABSTRACT

There is a need for providing a navigation system that enhances the freedom of settling time points to determine a destination. The system prompts a user to input only information needed for determining a target region (e.g., a region including several tourist spots or a region including several ski resorts) at a departure time. The system prompts a user to input information needed for determining a specific destination (e.g., a specific tourist spot, or a specific ski resort) halfway through the target region. Accordingly, the user need not determine a specific destination at the departure time.

20 Claims, 4 Drawing Sheets

LIST OF TARGET REGIONS
(CONDITION:NAGANO PREFECTURE & SKI)

| TARGETS | DENSITY |
|---|---|
| X1 REGION | 0.832 |
| X2 REGION | 0.452 |
| X3 REGION | 0.393 |
| X4 REGION | 0.216 |

LIST OF CALCULATED ROUTES

| ROUTES | PRIORITY |
|---|---|
| C. P. → Y-IC → S-IC → X1 | 0.608 |
| C. P. → M-IC → S-IC → X1 | 0.652 |
| C. P. → Y-IC → T-IC → X1 | 0.721 |
| C. P. → M-IC → T-IC → X1 | 0.856 | great # NAVIGATION SYSTEM

CROSS REFERENCE TO RELATED APPLICATIONS

This application is based on and incorporates herein by reference Japanese Patent Application No. 2005-242930 filed on Aug. 24, 2005.

FIELD OF THE INVENTION

The present invention relates to a navigation system for providing route guidance.

BACKGROUND OF THE INVENTION

Presently, the well-known navigation system necessitates a user to specify a destination in a pinpoint manner. That is, the user needs to specify a destination by locating an intended point on a map displayed on a display unit, selecting an address or a facility from a menu, or specifying a place stored in memory.

However, it may often occur that a user does not conceive of a specific visit place but is sure of conditions for a place to visit. For this purpose, there is available a navigation system that allows a user to supply conditions for a place to visit and retrieves and proposes visit places satisfying the conditions.

For example, the technology described in Patent document 1 below allows a user to supply a distance to the destination, the time required to reach the destination, and the like prior to initiation of the route guidance. The technology displays a list of places matching the conditions and allows the user to select an intended place from the list to determine the final destination.

The technology described in Patent document 2 below allows a user to supply an area the user wants to visit, a travel period, an estimated travel expense, and the like prior to initiation of the route guidance. The technology determines a facility satisfying the conditions as a destination.

Patent document 1: JP-2004-132884 A
Patent document 2: JP-2004-340757 A

Generally, a user often conceives of specific visit places when the destination is a nearby place. When the destination is faraway, however, it may often occur that the user does not conceive of specific visit places or the sequence of places to visit (visit sequence) and determines visit places or the visit sequence as the user approaches the destination. For example, a user intends to go on a drive from his or her home in Nagoya City and provisionally determines to just got to the Kansai area (including Kyoto City, Osaka City, Nara City, and Kobe City); when approaching Kyoto City via Nagoya-Kobe Expressway after the departure, the user finally determines to visit a certain temple in Kyoto City and then a certain shrine in Nara City.

When a visit place is indefinite at the departure time, a general navigation system cannot start the route guidance from the departure time. According to the above-mentioned technology described in Patent document 1 or 2, the departure time eventually determines a specific visit place. The user cannot determine only a destination area at the departure time or determine a specific visit place or a visit sequence halfway through the route. When the user determines a visit place or a visit sequence halfway through the route, additional operations are needed to change the already determined destination.

However, it is difficult for the general navigation system to change the visit place or the visit sequence in process of the route guidance. This is because many navigation systems are designed not to accept fine-tuning operations while a vehicle is running. First of all, the systems do not consider that the visit place or the visit sequence is surely changed.

SUMMARY OF THE INVENTION

The present invention has been made in consideration of the foregoing. It is therefore an object of the present invention to provide a navigation system that enhances the freedom of settling time points to determine a destination.

According to an aspect of the present invention, a navigation system is provided with the following. Map data acquisition means is included for acquiring map data to calculate a guiding route and perform route guidance. Acceptance means is included for accepting information from a user. Notification means is included for notifying the user. Control means is included to have first routing means, second routing means, and guidance means. The first routing means calculates using the map data a first guiding route from a start point to a target region, which is obtained based on first information for obtaining a target point, the first information being accepted by the acceptance means. The second routing means (i) causes the notification means to prompt the user to input second information for specifying a destination on a way through the first guiding route, (ii) specifies a destination based on the second information accepted by the acceptance means, and (iii) calculates using the map data a second guiding route to the specified destination. The guidance means provides route guidance by causing the notification means to notify the user of the first guiding route and the second guiding route.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Description of the Construction

Figure 1:
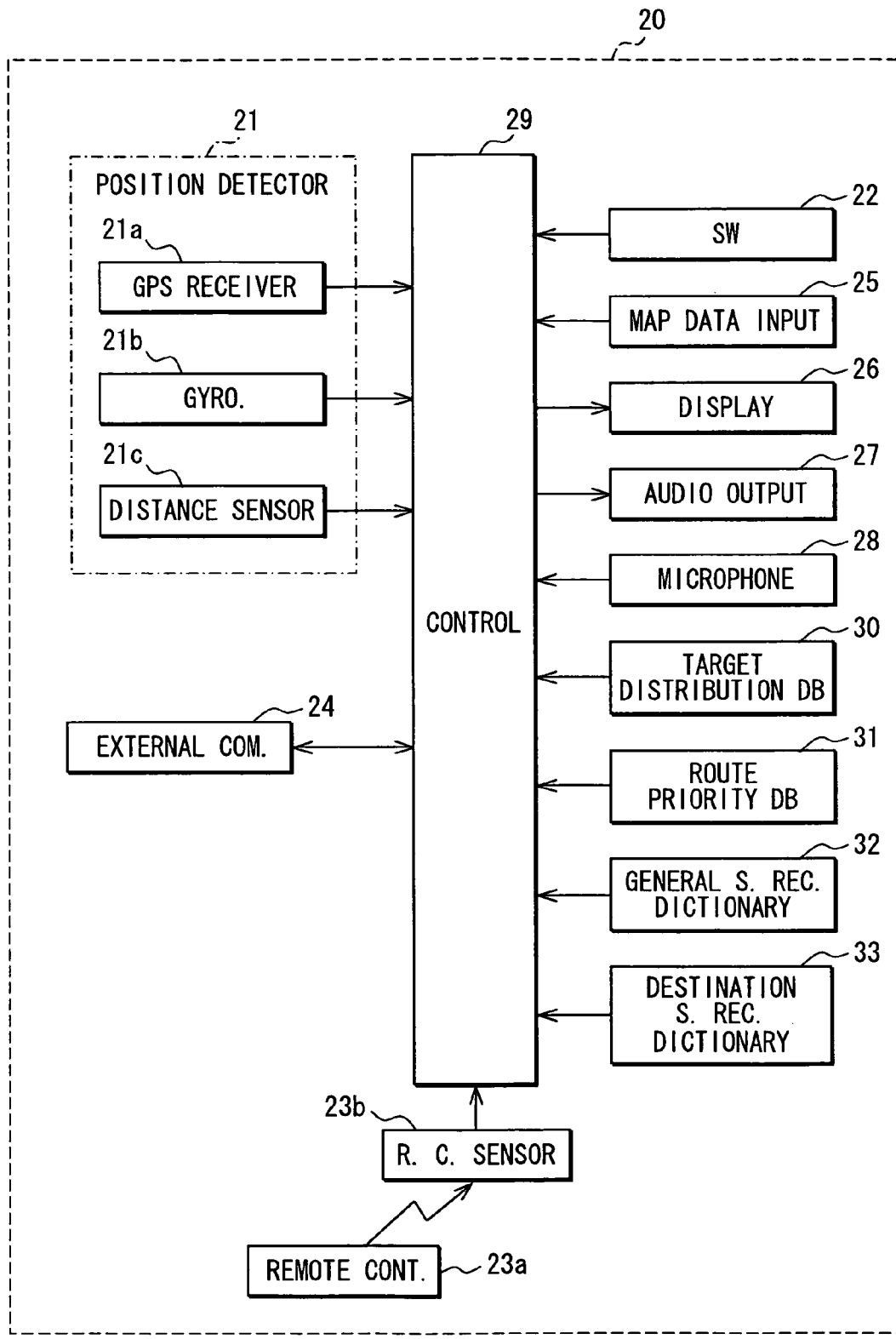
FIG. 1 is a block diagram showing a schematic construction of a navigation system as an example of an embodiment according to the present invention.

FIG. 1 is a block diagram showing a schematic construction of a navigation system 20 as an example of an embodiment according to the present invention.

The navigation system 20 in a subject vehicle includes a position detector 21, an operation switch group 22, a remote controller 23a, a remote control sensor 23b, an external communication device 24, a map data input device 25, a display unit 26, an audio output unit 27, a microphone 28, a target distribution density database 30, a route priority database 31, a general speech recognition dictionary 32, a destination specific speech recognition dictionary 33, and a control unit 29.

The position detector 21 detects a current position of the vehicle or navigation system 20 itself. The operation switch group 22 allows a user to supply various instructions, functioning as means for accepting instructions from a user. Similarly to the operation switch group 22, the remote controller 23a can enter various instructions and is available independently of the navigation system 20, functioning as means for accepting instructions from a user. The remote control sensor 23b is supplied with signals from the remote controller 23a. The external communication device 24 connects with a packet communication network and the like for communication with the outside. The map data input device 25 is supplied with data from a map storage medium that records map data, audio data, and the like. The display unit 26 displays maps and various information. The audio output unit 27 outputs various types of audio guidance. The microphone 28 generates an electric signal based on the speech uttered from a user.

The control unit 29 performs various processes in accordance with inputs from the position detector 21, the operation switch group 22, the remote control sensor 23b, the external communication device 24, the map data input device 25, the microphone 28, the target distribution density database 30, the route priority database 31, the general speech recognition dictionary 32, and the destination specific speech recognition dictionary 33. The control unit 29 controls the external communication device 24, the display unit 26, and the audio output unit 27.

The position detector 21 is provided with a GPS receiver 21a, a gyroscope 21b, and a distance sensor 21c. The GPS receiver 21a receives radio waves from artificial satellites for GPS (Global Positioning System) via a GPS antenna (not shown) and outputs a received signal. The gyroscope 21b detects the quantity of rotational motion applied to the vehicle. The distance sensor 21c detects a traveled distance based on the acceleration in the forward and backward directions of the vehicle and the like. The control unit 29 calculates the vehicle position, orientation, speed, and the like based on output signals from these sensors 21a through 21c. The point positioning system or the relative positioning system may be used as one of various systems to find the current position based on output signals from the GPS receiver 21a.

The operation switch group 22 is composed of a touch panel and mechanical key switches, functioning as means for accepting instruction from a user. The touch panel is integrated with the display surface of the display unit 26. The mechanical key switches are provided around the display unit 26. The touch panel and the display unit 26 are integrally layered. The touch panel may be available as any one of pressure sensitive, electromagnetic induction, and capacitance systems, or a combination of these.

The external communication device 24 acquires information about accident, congestion, and the like from a VICS (Vehicle Information and Communication System) information center via an optical beacon, a radio beacon, and the like installed on the road.

The map data input device 25 is supplied with various data from a map data storage medium (not shown) such as a hard disk and DVD-ROM, functioning as means for acquiring map information. The map data storage medium stores map data (node data, link data, background data, road data, name data, mark data, intersection data, facility data, and the like), audio data for guidance, and the like. These data may be supplied via a network instead of using the map data storage medium.

The display unit 26 is a color display device, functioning as means for notifying a user. The display unit 26 may be available as any one of a liquid crystal display, an organic EL display, and a CRT. A mark indicating the current position can be specified from the vehicle's current position detected by the position detector 21 and map data supplied from the map data input device 25. The display screen of the display unit 26 can display that mark in overlap with additional data such as a guiding route to the destination, names, spots, and various facility marks. The facility guidance can be also displayed.

The audio output unit 27 can output various types of audio guidance such as facility guidance supplied from the map data input device 25, functioning as means for notifying a user similarly to the display unit 26.

When a user inputs (utters) speech, the microphone outputs an electric signal (audio signal) based on the input speech to the control unit 29. The user can input various speech instructions to the microphone 28 to operate the navigation system 20.

The target distribution density database 30 is used for a destination setup process to be described later. The target distribution density database 30 is composed of distribution densities classified into regions and purposes. For example, the database stores data such as distribution densities of ski resorts in regions A, B, and C, and distribution densities of spas in regions A, B, and C. Specifying a region and a purpose can retrieve the distribution density of facilities satisfying the purpose. In this specification, the "distribution density" is obtained by dividing the number of facilities in each region by the corresponding region area and multiplying the quotient by a specified value.

The route priority database 31 is used for a destination setup process to be described later. For example, the database stores data such as time-based priorities of links A, B, and C, and distance-based priorities of links A, B, and C. Specifying a link and a condition can retrieve the priority. In this specification, the "priority" signifies a relative or absolute evaluation value. Comparing priorities indicates which link is prioritized in the specified condition.

The general speech recognition dictionary 32 is used for various operations such as settings and changes. The system searches the speech recognition dictionary for data matching the user-generated speech.

The destination specific speech recognition dictionary 33 is used for a destination limit process to be described later. The system searches the speech recognition dictionary for data matching the speech that is input during the destination limit process.

The control unit 29 is mainly constructed of a known microcomputer including CPU, ROM, RAM, SRAM, I/O, and a bus line connecting these components. The control unit 29 performs various processes based on programs stored in the ROM and the RAM. As an example, the control unit 29 calculates the vehicle's current position as a set of a coordinates and a traveling direction based on detected signals from the position detector 21. The control unit 29 allows the display unit 26 to display a map and the like near the current position read through the map data input device 25. As another example, the control unit 29 calculates an optimum route from the current position to a destination based on map data and the destination, functioning as routing means. The map data is stored in the map data input device 25. The destination is determined in accordance with operations of the operation switch group 22, the remote controller 23a, and the like. As still another example, the control unit 29 performs a route guidance process to guide the route by allowing the display unit 26 to display the calculated route or allowing the audio output unit 27 to output the calculated route as speech.

(Description of Operations)

The destination setup process and the destination limit process performed by the control unit 29 will be described.

The following description omits a description about the route guidance process and the like performed by the control unit of the general navigation system.

(1) Destination Setup Process

Figure 2:
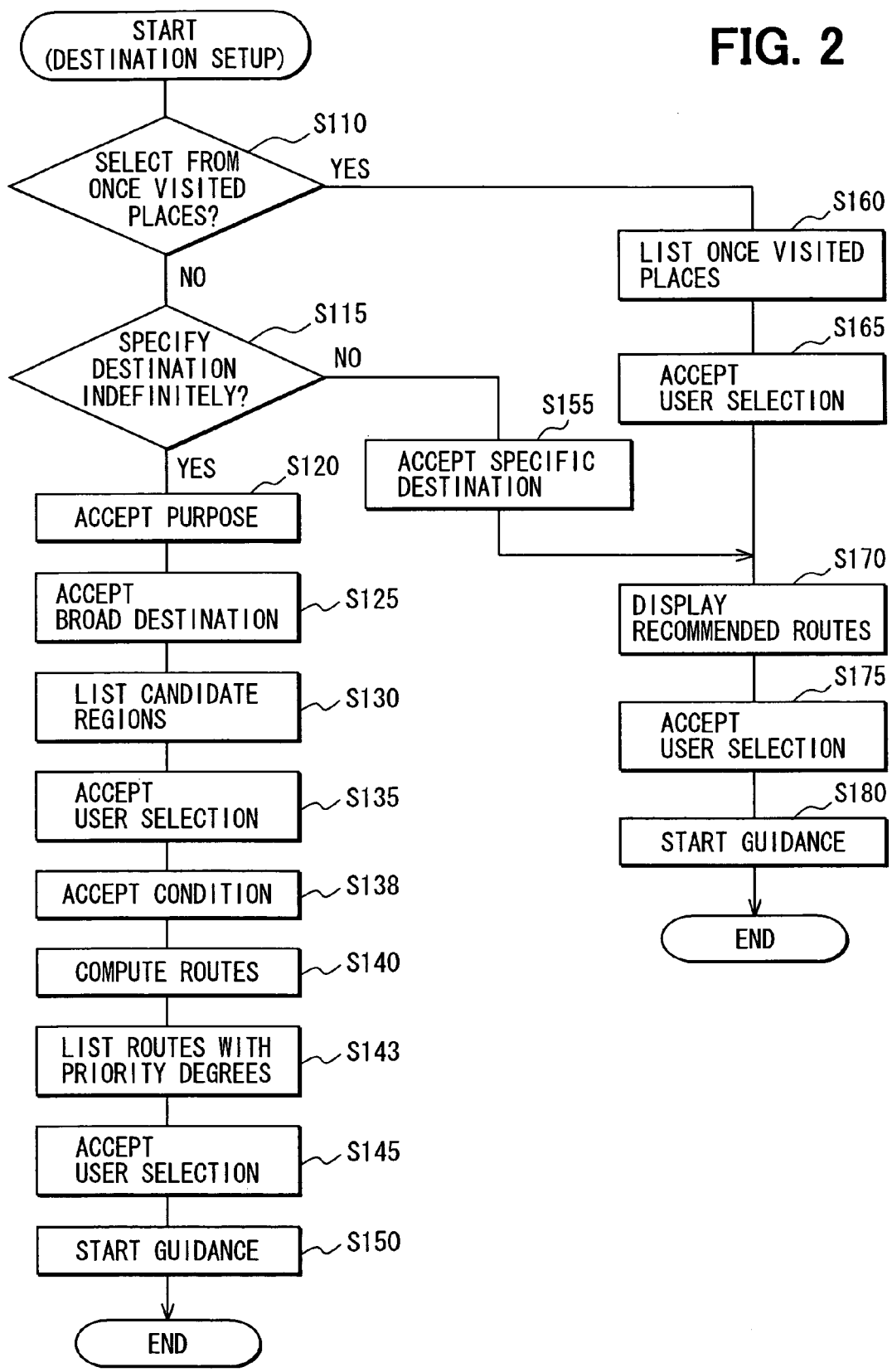
FIG. 2 is a flowchart showing a destination setup process in the navigation system in FIG. 1.

The destination setup process will be described with reference to a flowchart in FIG. 2. When a user presses the operation switch group 22 corresponding to execution of the destination setup process, the control unit 29 starts executing the destination setup process.

When starting the destination setup process, the control unit 29 inquires of a user whether or not to select a destination from the once visited places (S110). Specifically, the control unit 29 allows the display unit 26 to display an inquiry message or allows the audio output unit 27 to output an audio inquiry message. In response to the message, the user operates the operation switch group 22 or supplies a speech instruction to the microphone 28. According to the user action, the control unit 29 confirms the user's intention.

At Step S100, it may be determined that the user intends to select a destination from the once visited places (Yes at Step S110). Alternatively, it may be determined that the user intends to specify a new destination without selecting one from the once visited places (No at Step S110). When the result of Step S110 is Yes, the process proceeds to Step S160. When the result of Step S110 is No, the process proceeds to Step S115.

The process proceeds to Step S115 when it is determined that the user intends to specify a new destination. At Step S115, the control unit 29 inquires of the user whether or not the user specifies a destination indefinitely. The control unit 29 performs this inquiry in the same manner as Step S110. As a result of the inquiry, it may be determined that the user intends to specify a destination specifically (No at Step S115). Alternatively, it may be determined that the user intends to specify a destination indefinitely (Yes at Step S115). When the result of Step S115 is No, the process proceeds to Step S155. When the result of Step S115 is Yes, the process proceeds to Step S120.

The process proceeds to Step S120 when it is determined that the user intends to specify a destination indefinitely. At Step S120, the control unit 29 inquires of the user about a purpose of visiting a destination. For example, the "purpose" refers to shopping, sightseeing, hot spring bath, playing at an amusement park, skiing, golfing, and the like. The control unit 29 performs this inquiry in the same manner as Step S110.

The control unit 29 then inquires of the user about a broad destination (or orientation). The "broad destination" signifies a district across prefectures (e.g., Kanto area including multiple prefectures), a prefecture, a region (including multiple cities), a city, and the like. The control unit 29 performs this inquiry in the same manner as Step S110.

The control unit 29 references the target distribution density database 30. The control unit 29 allows the display unit 26 to display a list of target regions (e.g., four or five candidates) with high distribution densities out of target regions that match conditions. For example, let us suppose to enter "ski" as a purpose and "Nagano Prefecture" as a broad destination. Based on these conditions, the control unit 29 references the target distribution density database 30. The control unit 29 lists region names (X1 to X4) in Nagano Prefecture and distribution densities of ski resorts in the regions (see FIG. 3A). In this example, the "distribution density" is obtained by dividing the number of ski resorts in each region by the corresponding region area and multiplying the quotient by a specified value.

The control unit 29 accepts the user's selection operation for target regions (S135). This step specifies one target region the user selected from a list of target regions displayed on the display unit 26 at Step S130. Specifically, the control unit 29 specifies one target region in accordance with the user action of operating the operation switch group 22 or supplying a speech instruction to the microphone 28.

The control unit 29 accepts a route calculation condition from the user (S138). This step provides the user with "prioritizing time," "prioritizing distance," and "prioritizing toll fare," and determines which condition the user selected. The control unit 29 performs this inquiry in the same manner as Step S110.

At Step S140, the control unit 29 calculates several routes (e.g., four or five routes) from the start point (e.g., current position) for the route guidance to the target region based on the map data through the map data input device 25. The target region is specified at Step S135 by accepting the user's selection operation. The route calculation is not limited to the same route end point. Different end points may be assigned to respective routes. The route end point may be settled at any place in the target region. For example, the route end point may be settled at a point where a main highway enters the target region or at the center of the target region. The widely known Dijkstra algorithm or the like is used to calculate routes.

At Step S143, the control unit 29 references the route priority database 31 to calculate a priority degree for each route calculated at Step S140. Specifically, the control unit 29 searches the route priority database 31 by specifying links constituting the calculated route and the conditions accepted at Step S138. The control unit 29 adds resulting priorities to each other to calculate a priority degree. The control unit 29 allows the display unit 26 to list sets of the calculated route and the calculated priority degree (see FIG. 3B).

The control unit 29 then accepts the user operation to select a route (S145). This step specifies one route the user selects from the list displayed on the display unit 26 at Step S143. Specifically, the control unit 29 specifies a route in accordance with the user action of operating the operation switch group 22 or supplying a speech instruction to the microphone 28.

At Step S145, the control unit 29 starts the guidance (route guidance process) for the route specified by accepting the user's selection operation and terminates the previous process (destination setup process). The guidance starting at this step does not settle the final destination. The control unit 29 needs to execute the destination limit process to be described until the guidance terminates. For this purpose, the control unit 29 turns on an execution flag (provided for the RAM in the control unit 29) to execute the destination limit process.

The process proceeds to Step S155 when it is determined at Step S115 that the user intends to specify a destination specifically. At Step S155, the control unit 29 accepts a specific destination from the user. To do this, generally known techniques are used. For example, the control unit 29 allows the user to utter the destination and recognizes the speech to specify the destination. Alternatively, the control unit 29 allows the display unit 26 to display the Japanese syllabary and allows the user to sequentially select syllables of the destination to specify the destination. When the destination is specified at Step S155, the process proceeds to Step S170.

When it is determined at Step S110 that the user intends to select a destination from the once visited places, the process proceeds to Step S160. At Step S160, the control unit 29 allows the display unit 26 to display a list of destinations based on the information about visited places stored in SRAM and the like of the control unit 29. The control unit 29 then accepts the user operation to select a destination (S165). This step specifies a destination selected by the user from the list displayed on the display unit 26 at Step S160. Specifically, the control unit 29 specifies the destination in accordance with the user action of operating the operation switch group 22 or supplying a speech instruction to the microphone 28.

At Step S170, the control unit 29 calculates several recommended routes (e.g., four or five candidates) to the destination specified at Step S155 or S165 and allows the display unit 26 to list the calculated routes. The control unit 29 then accepts the user operation to select a route (S175). This step specifies a route the user selects from the list displayed on the display unit 26 at Step S170. Specifically, the control unit 29 specifies one route in accordance with the user action of operating the operation switch group 22 or supplying a speech instruction to the microphone 28.

At Step S180, the control unit 29 starts the guidance (route guidance process) for the route specified at Step S170 and terminates the previous process (destination setup process). The control unit 29 turns off the execution flag to execute the destination limit process.

(2) Destination Limit Process

Figure 4:
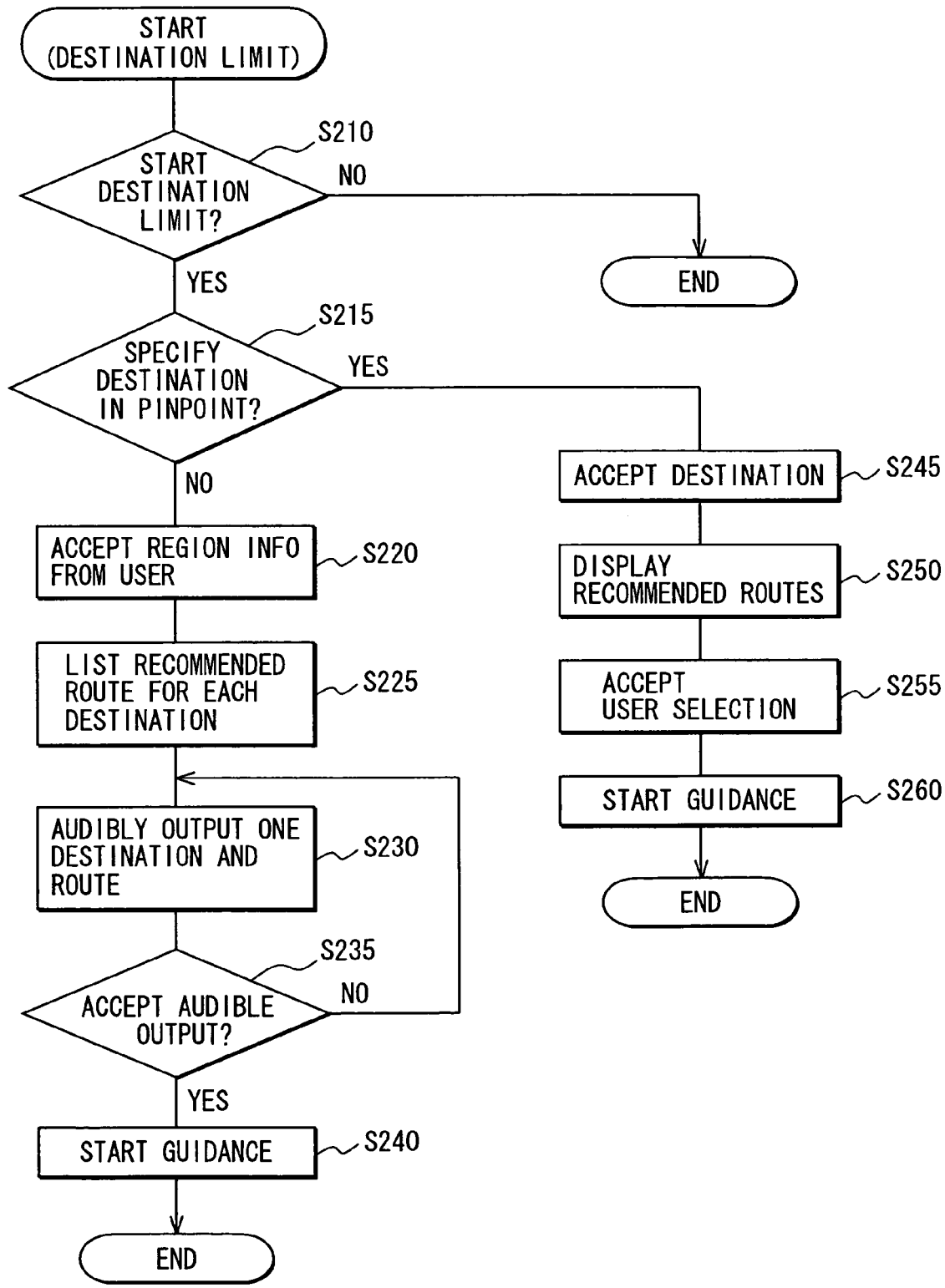
FIG. 4 is a flowchart showing a destination limit process in the navigation system in FIG. 1.

The destination limit process will be described with reference to a flowchart in FIG. 4. When the execution flag is turned on, the control unit 29 executes the destination limit process in the following states. The user presses the operation switch group 22 signifying execution of the destination limit process. Alternatively, a specified condition is satisfied during the route guidance.

An example of the "specified condition" is that the vehicle has traveled 50% or more and 80% or less of the entire itinerary and stops five minutes or more. Another example is that the vehicle has traveled 40% or more and 90% or less of the entire itinerary and stops at a service area or a convenience store. That is, the specified condition is satisfied after the vehicle has passed a certain amount of the itinerary and makes it possible to assume the user to be ready for input operations.

When starting the destination setup process, the control unit 29 inquires of the user whether or not to start the destination limit process (S210). Specifically, the control unit 29 allows the display unit 26 to display an inquiry message or allows the audio output unit 27 to output an audio inquiry message. In response to the message, the user operates the operation switch group 22 or supplies a speech instruction to the microphone 28. According to the user action, the control unit 29 confirms the user's intention.

At Step S210, it may be determined that the user wishes to execute the destination limit process (Yes at Step S210). Alternatively, it may be determined that the user does not wish to execute the destination limit process (No at Step S210). When the result of Step S210 is Yes, the process proceeds to Step S215. When the result of Step S210 is No, the process (destination limit process) terminates.

The process proceeds to Step S215 when it is determined that the user wishes to execute the destination limit process. At Step S215, the control unit 29 inquires of the user whether or not to specify a destination in a pinpoint manner. "Specifying a destination in a pinpoint manner" signifies that the user specifies a specific destination. For example, the user specifies an address, a facility name, or a location on a map displayed on the display unit 26. The control unit 29 performs this inquiry in the same manner as Step S210.

When it is determined at Step S215 that the user wishes to specify a destination in a pinpoint manner (Yes), the process proceeds to Step S245. When it is determined at Step S215 that the user does not wish to specify a destination in a pinpoint manner (No), the process proceeds to Step S220.

The process proceeds to Step S220 when it is determined that the user does not wish to specify a destination in a pinpoint manner. At Step S220, the control unit 29 accepts detailed region information about the destination from the user. The "detailed region information" signifies a region narrower than the target region applied to the above-mentioned destination setup process. For example, the detailed region information refers to a zone name, city name, direction (area), and the like.

At Step S225, the control unit 29 selects destination candidates satisfying the detailed region information accepted at Step S220 and the purpose accepted at Step S120 of the above-mentioned destination setup process. The control unit 29 allows the display unit 26 to list a recommended route for each candidate one by one.

At Step S230, the control unit 29 allows the audio output unit 27 to audibly output candidates of one destination selected at Step S220 and the recommended route. The audio output unit 27 outputs a candidate of one destination and a corresponding recommended route that are not output yet.

At Step S235, the control unit 29 inquires of the user whether or not to accept the output destination and its recommended route audibly output at Step S230. Specifically, the control unit 29 generates the audio output at Step S230 followed by an audio inquiry message such as "do you accept the destination and the route?" In response to the message, the user operates the operation switch group 22 or supplies a speech instruction to the microphone 28. According to the user action, the control unit 29 confirms the user's intention.

When it is determined that the user accepts the destination and the recommended route audibly output at Step S230 (Yes at Step S235), the process proceeds to Step S240. When it is determined that the user rejects the destination and the recommended route audibly output at Step S230 (No at Step S235), the process returns to Step S230. At Step S240, the control unit 29 starts the guidance (route guidance process) of the confirmed route up to the destination confirmed at Step S235 and terminates the previous process (destination limit process).

The process proceeds to Step S245 when it is determined at Step S215 that the user wishes to specify a destination in a pinpoint manner. At Step S245, the control unit 29 accepts a specific destination from the user. To do this, generally known techniques are used. For example, the control unit 29 allows the user to utter the destination and recognizes the speech to specify the destination. Alternatively, the control unit 29 allows the display unit 26 to display the Japanese syllabary and allows the user to sequentially select syllables of the destination to specify the destination.

At Step S250, the control unit 29 calculates several recommended routes (e.g., four or five candidates) to the destination specified at Step S245 and allows the display unit 26 to display the calculated routes. The control unit 29 then accepts the user operation to select a route (S255). This step specifies a route the user selects from the list displayed on the display unit 26 at Step S250. Specifically, the control unit 29 specifies a route in accordance with the user action of operating the operation switch group 22 or supplying a speech instruction to the microphone 28.

At Step S260, the control unit 29 starts the guidance (route guidance process) of the route specified at Step S255 and terminates the previous process (destination limit process).

(Effects)

Figures 3A, 3B, 5:
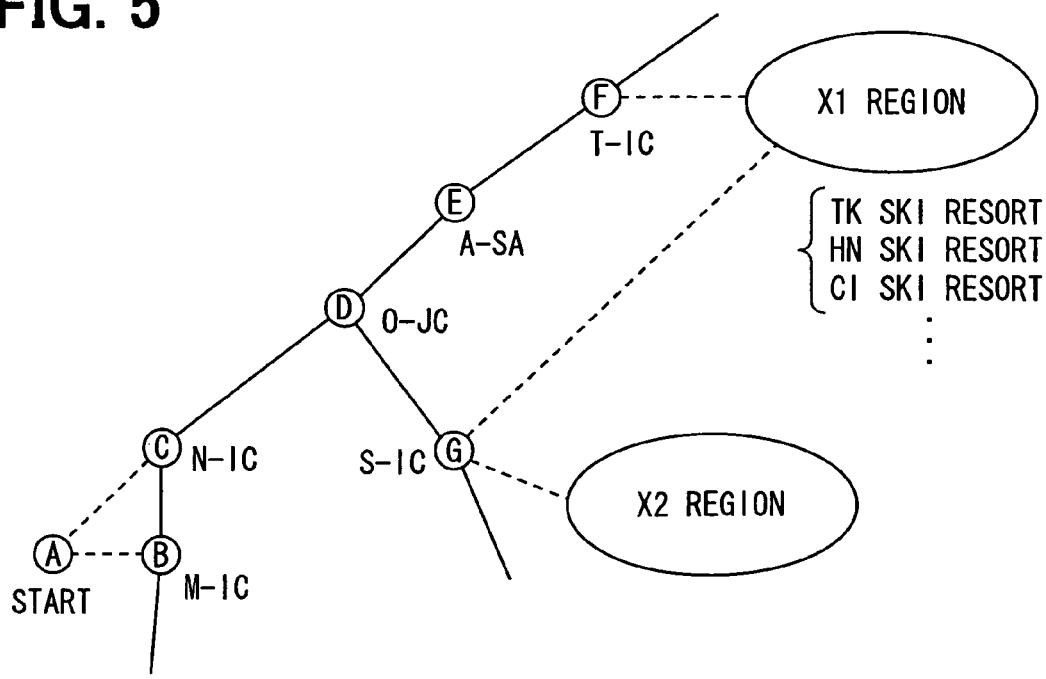
FIG. 3A is a diagram exemplifying a destination region selection list.
FIG. 3B is a diagram exemplifying a route selection list.
FIG. 5 is an explanatory diagram showing an example.

Effects of the above example will be described with reference to an explanatory diagram in FIG. 5.

For instance, the navigation system 20 provides the route guidance in the following procedure.

(1) When a user wishes to indefinitely specify a destination at the start point, the system prompts the user to enter a purpose and a broad destination (S120, S125). When the user enters "ski" as the purpose and "Nagano Prefecture" as the broad destination, the system presents the regions such as X1 region (Hakuba region) and X2 region (Shirakabako region) matching the conditions (S130). When the user enters the "X1 region," the system calculates the route to X1 region and presents route candidates (S143). When the user selects any one of the routes, the system starts the guidance based on the selected route such as point A (start point)->point C (N-IC: Nagoya Interchange (toll gate))->point D (O-JC: Okaya Junction)->point F (T-IC: Toyoshina Interchange)->X1 (Hakuba region) (S150).

(2) Let us suppose that the user rests for about 15 minutes at point E (A-SA: Azusagawa Service Area). The system then starts execution of the destination limit process and prompts the user whether or not to continue the destination limit process (S210). When the user enters an instruction to continue the destination limit process (Yes at step S210), the system prompts the user whether or not to specify the destination in a pinpoint manner (S215). When the user enters an instruction not to specify the destination in a pinpoint manner (No at Step S215), the system prompts the user to enter the detailed region information (S220). When the user enters "Otari village" as the detailed region information, the system retrieves ski resorts in the Otari village such as TK ski resort (Tsugaike Highland ski resort), HN ski resort (Hakuba Norikura ski resort), and CI ski resort (Cortina International ski resort) and presents them along with the recommended routes (S225). The system presents these ski resorts not only visually on the display unit 26, but also audibly. The user can also audibly specify a ski resort (S230, S235). When the user selects any one of the ski resorts, the system starts execution of the route guidance to the ski resort (S240).

As mentioned above using the example, the navigation system 20 allows the user to specify only the target region at the departure time without specifying a destination (visit place). When the vehicle approaches the target region, the navigation system 20 prompts the user to determine the destination. The user only needs to determine the specific destination at this time point. Accordingly, the navigation system 20 is user-friendly because the user can delay the time point to determine the destination.

The navigation system 20 prompts the user to determine the destination at a time point that satisfies such a state as to make the user to be ready for input operations. An example of the state is that the vehicle has traveled 50% or more and 80% or less of the entire itinerary and stops five minutes or more. Another example is that the vehicle has traveled 40% or more and 90% or less of the entire itinerary and stops at a service area or a convenience store. Consequently, the user can determine the destination without haste.

(Others)

The other examples will be described.

(1) According to the above-mentioned example, the control unit 29, with the execution flag turned on, starts the destination limit process in the following states. The user presses the operation switch group 22 signifying execution of the destination limit process. Alternatively, a specified condition is satisfied during the route guidance. Further, the route guidance may be provided from the departure time so as to pass through a place to execute the destination limit process. That is, the above-mentioned example may calculate a route and provide the guidance from the departure time so as to intentionally stop at A-SA (Azusagawa SA) in FIG. 5. In this manner, the system can reliably execute the destination limit process. Further, when the user presses the operation switch group 22 signifying execution of the destination limit process, the system may provide the route guidance to a nearest place (e.g., a nearest service area) where the user becomes ready for input operations.

In this manner, the user can start the destination limit process at any time point convenient for the user. Also in this case, the user can calmly input information needed for specifying a destination while safely parking the vehicle.

(2) The above-mentioned example allows the destination limit process to determine only one destination. Further, it may be preferable to input multiple destinations and visit sequences. That is, it may be preferable to repeat Step S220 or S245 of the destination limit process and input multiple destinations. The route guidance may be provided so as to visit the destinations in the order of input. This improves user-friendliness.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system used for a vehicle, the system comprising:

map data acquisition means for acquiring map data to calculate a guiding route and perform route guidance;

acceptance means for accepting information from a user;

notification means for notifying the user; and control means including first routing means for calculating using the map data a first guiding route from a start point to a target region, which is obtained based on first information, the first information being accepted by the acceptance means from the user, second routing means for (i) causing, while approaching the target region via the first guiding route, the notification means to prompt the user to input second information for specifying a destination, (ii) specifying a destination, based on the second information from the user, accepted by the acceptance means, and (iii) re-calculating after calculating the first guiding route, using the map data, a second guiding route to the specified destination, and guidance means for providing route guidance by causing the notification means to notify the user of the first guiding route and the second guiding route, the first routing means being further configured to cause the acceptance means to accept a visit purpose, cause the notification means to notify the user of target regions, the target regions being notified in descending order of distribution densities of facilities corresponding to the accepted visit purpose when there are plural target regions, cause the acceptance means to accept, from the user, third information for specifying one of the target regions which were notified, and calculate the first guiding route to the target region specified based on the third information.

2. The navigation system according to claim 1, wherein the first routing means calculates a plurality of guiding routes for the target region, and wherein the guidance means causes the notification means to notify the user of the calculated guiding routes from a higher priority degree, and causes the notification means to notify the user of the guiding route specified based on the third information to provide route guidance.

3. The navigation system according to claim 1, wherein the acceptance means recognizes speech uttered by the user to accept information and uses a special speech recognition dictionary to accept the second information.

4. The navigation system according to claim 1, wherein, when the vehicle stops, the second routing means allows the notification means to prompt the user to input the second information.

5. The navigation system according to claim 1, wherein the first routing means calculates the first guiding route to the target region so as to pass through a place where the vehicle is allowed to stop, and wherein, when the vehicle arrives at the place, the first routing means allows the notification means to prompt the user to input the second information.

6. A method for performing route guidance in a navigation system, the method comprising:

accepting, from a user, first information and a visit purpose;

calculating, using map data, a first guiding route from a start point to a target region, which is obtained based on the first information from the user;

notifying the user of the first guiding route and of target regions, the target regions being notified in descending order of distribution densities of facilities corresponding to the accepted visit purpose when there are plural target regions;

accepting, from the user, third information for specifying one of the target regions which were notified;

calculating the first guiding route to the target region specified based on the third information;

prompting the user, while approaching the target region via the first guiding route, to input second information for specifying a destination;

accepting the second information from the user;

specifying a destination, based on the second information from the user;

re-calculating after calculating the first guiding route, using the map data, a second guiding route to the specified destination; and notifying the user of the second guiding route.

7. A navigation system used for a vehicle, the system comprising:

a map data acquisition unit configured to acquire map data to calculate a guiding route and perform route guidance;

an acceptance unit configured to accept information from a user;

a notification unit configured to notify the user; and a control unit including a first routing unit configured to calculate, using the map data, a first guiding route from a start point to a target region, which is obtained based on first information from the user, the first information being accepted by the acceptance unit, a second routing unit configured to (i) cause, while approaching the target region via the first guiding route, the notification unit to prompt the user to input second information for specifying a destination, (ii) specify a destination, based on the second information from the user, accepted by the acceptance unit, and (iii) re-calculate, after calculating the first guiding route, using the map data a second guiding route to the specified destination, and a guidance unit configured to provide route guidance by causing the notification unit to notify the user of the first guiding route and the second guiding route, the first routing unit being further configured to cause the acceptance unit to accept a visit purpose, cause the notification unit to notify the user of target regions, the target regions being notified in descending order of distribution densities of facilities corresponding to the accepted visit purpose when there are plural target regions, cause the acceptance unit to accept, from the user, third information for specifying one of the target regions which were notified, and calculate the first guiding route to the target region specified based on the third information.

8. The navigation system according to claim 1, wherein:

the second routing means of the control means is configured to (i) causes the notification means to prompt the user to input second information for specifying a destination when the vehicle approaches the target region on a way through the first guiding route, (ii) specifies the destination based on the second information accepted by the acceptance means, and (iii) calculates using the map data the second guiding route to the specified destination; and the guidance means of the control means is configured to provide the route guidance by causing the notification means to notify the user of (i) the first guiding route before the second guiding route is calculated and (ii) the second guiding route after the second guiding route is calculated.

9. A navigation system used for a vehicle, the system comprising:

map data acquisition means for acquiring map data to calculate a guiding route and perform route guidance;

acceptance means for accepting information from a user;

notification means for notifying the user; and control means including first routing means for calculating, using the map data, a first guiding route from a start point to a target region, which is obtained based on first information from the user, the first information being accepted by the acceptance means, second routing means for (i) causing, while approaching the target region via the first guiding route, the notification means to prompt the user to input second information for specifying a destination when the vehicle approaches the target region, (ii) specifying a destination, based on the second information from the user, accepted by the acceptance means, and (iii) re-calculating, after calculating the first guiding route, using the map data, a second guiding route to the specified destination, and guidance means for providing route guidance by causing the notification means to notify the user of the first guiding route and the second guiding route, the first routing means being further configured to cause the acceptance means to accept a visit purpose, cause the notification means to notify the user of target regions, the target regions being notified in descending order of distribution densities of facilities corresponding to the accepted visit purpose when there are plural target regions, cause the acceptance means to accept, from the user, third information for specifying one of the target regions which were notified, and calculate the first guiding route to the target region specified based on the third information.

10. The navigation system according to claim 9, wherein the guidance means of the control means is configured to provide the route guidance by causing the notification means to notify the user of (i) the first guiding route before the second guiding route is calculated and (ii) the second guiding route after the second guiding route is calculated.

11. A navigation system used for a vehicle, the system comprising:

map data acquisition means for acquiring map data to calculate a guiding route and perform route guidance;

acceptance means for accepting information from a user;

notification means for notifying the user; and control means including first routing means for calculating, using the map data, a first guiding route from a start point to a target region, which is obtained based on first information for obtaining a target point, wherein the target region is a region encompassing possible target points, the first information being accepted by the acceptance means, second routing means for (i) causing, while on a way approaching the target region via the first guiding route, the notification means to prompt the user to input second information for specifying a destination on the way via the first guiding route, (ii) specifying a destination based on the second information accepted by the acceptance means, and (iii) calculating, using the map data, a second guiding route to the specified destination, and guidance means for providing route guidance by causing the notification means to notify the user of the first guiding route and the second guiding route, the first routing means being further configured to cause the acceptance means to accept a visit purpose, cause the notification means to notify the user of target regions, the target regions being notified in descending order of distribution densities of facilities corresponding to the accepted visit purpose when there are plural target regions, cause the acceptance means to accept, from the user, third information for specifying one of the target regions which were notified, and calculate the first guiding route to the target region specified based on the third information.

12. The navigation system according to claim 1, the second routing means being further configured to cause, while approaching the target region via the first guiding route, the notification means to prompt the user to input second information for specifying a destination at a time point that satisfies such a state as to make the user to be ready for input operations.

13. The navigation system according to claim 12, the state as to make the user to be ready for input operations being satisfied when the vehicle stops under a predetermined condition after having traveled a predetermined ratio of an entire itinerary.

14. The navigation system according to claim 13, the predetermined condition being satisfied by the vehicle being continuously stopped for more than five minutes.

15. The navigation system according to claim 13, the predetermined condition being satisfied by the vehicle being continuously stopped at least one of a service area and a convenience store.

16. The navigation system according to claim 1, the second routing means being configured to prompt for one of the facilities within the target region of the first routing means that correspond to the accepted visit purpose, the first routing means being further configured to determine the distribution densities, and to place the target regions in the descending order by distribution density, the distribution density being the aggregate amount, per target region, of the facilities corresponding to the accepted visit purpose.

17. The method according to claim 6, further comprising determining the distribution densities of facilities corresponding to the accepted visit purpose, and placing the target regions in the descending order by distribution density, the distribution density being the aggregate amount, per target region, of the facilities corresponding to the accepted visit purpose, the destination being prompted to the user in the prompting step being one of the facilities within the target region that correspond to the accepted visit purpose.

18. The navigation system according to claim 7, the second routing unit being configured to prompt for one of the facilities within the target region of the first routing unit that correspond to the accepted visit purpose, the first routing unit being further configured to determine the distribution densities, and to place the target regions in the descending order by distribution density, the distribution density being the aggregate amount, per target region, of the facilities corresponding to the accepted visit purpose.

19. The navigation system according to claim 9, the second routing means being configured to prompt for one of the facilities within the target region of the first routing means that correspond to the accepted visit purpose, the first routing means being further configured to determine the distribution densities, and to place the target regions in the descending order by distribution density, the distribution density being the aggregate amount, per target region, of the facilities corresponding to the accepted visit purpose.

20. The navigation system according to claim 11,
the second routing means being configured to prompt for one of the facilities within the target region of the first routing means that correspond to the accepted visit purpose, the first routing means being further configured to determine the distribution densities, and to place the target regions in the descending order by distribution density,
the distribution density being the aggregate amount, per target region, of the facilities corresponding to the accepted visit purpose.

* * * * *